United States Patent
Lee et al.

(10) Patent No.: US 8,403,487 B2
(45) Date of Patent: Mar. 26, 2013

(54) STEREO-IMAGE DISPLAYING APPARATUS AND METHOD FOR REDUCING STEREO-IMAGE CROSS-TALK

(75) Inventors: Kuen Lee, Hsinchu (TW); Kuo-Chung Huang, Taipei County (TW); Chao-Hsu Tsai, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 362 days.

(21) Appl. No.: 12/055,320

(22) Filed: Mar. 26, 2008

(65) Prior Publication Data
US 2009/0168022 A1    Jul. 2, 2009

(30) Foreign Application Priority Data

Dec. 31, 2007    (TW) .............................. 96151502 A

(51) Int. Cl.
*G03B 21/00* (2006.01)
*G03B 21/14* (2006.01)
*G02B 27/24* (2006.01)

(52) U.S. Cl. ................. 353/7; 353/89; 359/472
(58) Field of Classification Search ............... 353/7, 88, 353/89; 359/464, 466, 472; 348/54, 55, 348/56; 349/8
See application file for complete search history.

(56) References Cited

U.S. PATENT DOCUMENTS

| 5,663,831 A | 9/1997 | Mashitani et al. | |
| 6,542,296 B2 * | 4/2003 | Lee et al. | 359/462 |
| 6,940,646 B2 | 9/2005 | Taniguchi et al. | |
| 2005/0088403 A1* | 4/2005 | Yamazaki | 345/102 |
| 2006/0279567 A1* | 12/2006 | Schwerdtner et al. | 345/419 |

FOREIGN PATENT DOCUMENTS

| TW | 536646 | 6/2003 |
| TW | 200724975 | 7/2007 |

OTHER PUBLICATIONS

Article titled "Measurement of contrast Ratios for 3D Display" authored by Huang, et al., Proc. SPIE vol. 4080, p. 78-86, Jul. 2000.
Article titled "8.2:A High Resolution Autostereoscopic Display Employing a Time Division Parallax Barrier" authored by Lee et al., SID Symposium Digest of Technical Papers—Jun. 2006—vol. 37, Issue 1, pp. 81-84.
Article titled "Cancellation of Image Crosstalk in Time-Sequential Displays of Stereoscopic Video" authored by Konrad et al., IEEE Transactions on Image Processing, vol. 9, No. 5 May 2000, pp. 897-908.

(Continued)

*Primary Examiner* — William C Dowling
*Assistant Examiner* — Ryan Howard
(74) *Attorney, Agent, or Firm* — Jianq Chyun IP Office

(57) ABSTRACT

A stereo-image displaying apparatus including an adjustable light source module, a spatial modulator, and an image display panel is provided. The adjustable light source module is adapted for emitting a plurality of first illumination beams and a plurality of second illumination beams that are staggered along a first axis. The spatial modulator and the image display panel are sequentially disposed on the light path of the first and second illumination beams. The first illumination beam passes through the spatial modulator so that the image display panel displays a first view field image in a first frame period. The second illumination beam passes through the spatial modulator so that the image display panel displays a second view field image in a second frame period. Moreover, a method for reducing stereo-image cross-talk is also provided.

10 Claims, 7 Drawing Sheets

OTHER PUBLICATIONS

Article titled "Characterizing Sources of Ghosting in Time-Sequential Stereoscopic Video Displays" authored by Woods et al., presented at Stereoscopic Displays and Applications XIII, published in Stereoscopic Displays and Virtual Reality System IX, Proceedings of SPIE vol. 4660, San Jose, California, Jan. 21-23, 2003.

Article titled "A study of how crosstalk affects stereopsis in stereoscopic displays" authored by Huang et al., SPIE proceedings series, 2003, vol. 5006, pp. 247-253.

Article titled "Elimination of keystone and crosstalk effects in stereoscopic video" authored by Bertrand Lacotte. Tech. Rep. 95-31, INRS-Telecomrnunications, Dec. 1995.

Article titled "Factors affecting "ghosting" in time-multiplexed plano-stereoscopic CRT display systems" authored by Lenny Lipton, SPIE vol. 761 Ture 3D Imaging Techniques and Display Technologies (1987) pp. 75-78.

Article titled "Image crosstalk reduction in stereoscopic laser-based display systems" authored by Pommeray et al., Journal of Electronic Imaging / Oct. 2003 / vol. 12(4) pp. 689-696.

Article titled "Reducing crosstalk between stereoscopic views" authored by Lipscomb et al., SPIE vol. 2177 pp. 92-96, online publication date, Nov. 1, 2004.

Article titled "Subjective Evaluation of Cross Talk Disturbance in Stereoscopic Displays" authored by Hanazato et al., ISSN 1083-1312/00/2001-0288 pp. 2813-291, The 20th International Display Research Conference, 2000.

"Office Action of Taiwan Counterpart Application", issued on Sep. 7, 2011.

* cited by examiner

STEREO-IMAGE DISPLAYING APPARATUS AND METHOD FOR REDUCING STEREO-IMAGE CROSS-TALK

CROSS-REFERENCE TO RELATED APPLICATION

This application claims the priority benefit of Taiwan application serial no. 96151502, filed on Dec. 31, 2007. The entirety of the above-mentioned patent application is hereby incorporated by reference herein and made a part of this specification.

BACKGROUND OF THE INVENTION

1. Field of the Invention

The present invention generally relates to a stereo-image displaying technology, in particular, to a stereo-image displaying apparatus and a method for reducing stereo-image cross-talk.

2. Description of Related Art

The three-dimensional (3D) displaying manner has stepped into a commercialization stage as the vigorous development of the displays. It is a common understanding in this industry that 3D displaying apparatus certainly will become an important developing direction for displays in the next generation. More and more markets, for example, medicine, exhibition, entertainment, education, military, design, and advertisement etc., need the naked-eye 3D displaying technology.

However, the 3D displaying technology still encounters various obstacles, as it has gradually become prevailing. One of the largest obstacles still lies in the limitation of the displaying technology itself. Currently, one of the main bottlenecks of the 3D display commercialization is that, the image quality cannot satisfy the users' demands in the aspects of, for example, viewing angle, and number of the viewers, as compared with the 2D display. The problem most distinctly affected the 3D displaying effect is a cross-talk between stereo-images. In the 3D technology, the image quality has not been significantly improved, and particularly, no effective solving method is proposed for the cross-talk problem that most seriously affects the eye vision.

The cross talk index is listed as a basic parameter of the 3D displaying apparatus. The ghost problem resulted from the cross-talk is always an important topic in the research of the 3D displaying apparatus. In time-multiplex 3D displaying apparatus, mostly the response speed of the displaying apparatus is not sufficiently high. Currently, the main stream 2D displaying apparatus is liquid crystal display (LCD) device, and the LCD device, as a non-self-luminous display, has different response characteristics compared with the self-luminous display in the past, for example, CRT display. Particularly, as the requirement for the response speed of the stereo-image is usually 2 times or even higher than that for the common display device, no matter how fast the speed of the 2D display has developed, an even higher response speed is required in the 3D applications. As the 3D displaying technology has a higher requirement for the reaction speed, the cross-talk problem for the left and right eyes becomes increasingly serious.

As for the 3D displaying technology, in accordance with the vision characteristics of human eyes, when two images with different parallaxes are respectively viewed with the left and right eyes, a stereo-image is formed. However, if the reaction speed for the image displaying is not sufficiently high, for example, some image of the left eye is residual for the right eye during the switching, and vise versa. In this manner, the so-called ghost image is generated, that is, when viewing the image of the left eye, the left eye views another overlapped weak image at the same time, which is the image of the previous image frame for the right eye. FIG. 1 is a schematic view of a conventional image cross-talk phenomenon. In FIG. 1, under the ideal state (on the left part of the figure), for example, an image signal 100 is an image for the left eye, and an image signal 102 is an image for the right eye. Under this situation, the display only displays the image content of the right eye. However, if the image cross-talk phenomenon occurs (on the right part of the figure), the display displays the image of the left eye and a previously residual image 104 of the right eye at the same time, and similarly, the right eye may view the residual image 106 of the left eye.

In order to solve the above cross-talk problem, an image processing manner is adopted in the conventional art. That is, the cross-talk intensity of the 3D display is removed in the image before hand, and thus, when the cross-talk is generated during the actual viewing process, the removed image intensity can be compensated. FIG. 2 is a schematic view of a mechanism of improving the cross-talk by using an image-processing manner in the conventional art. Through the image processing manner, the left and right eye images 100 and 102 are displayed as compensation images 108 and 110. In this manner, due to the residual images, the cross-talk phenomenon is eliminated in the pre-processed compensation image 108, and thus the residual image of the left eye does not exist.

However, the disadvantage of the above technology lies in greatly reducing the single eye image contrast intensity. Therefore, other different solutions for eliminating the cross-talk phenomenon have been continuously researched.

SUMMARY OF THE INVENTION

Accordingly, the present invention is directed to a stereo-image displaying apparatus, which is capable of reducing the cross-talk and improving the stereo-image quality.

The present invention is also directed to a method for reducing stereo-image cross-talk, which is capable of reducing the cross-talk and improving the stereo-image quality.

The present invention provides a stereo-image displaying apparatus, which includes an adjustable light source module, a spatial modulator, and an image display panel. The adjustable light source module is adapted for emitting a plurality of first illumination beams and a plurality of second illumination beams that are staggered along a first axis. The spatial modulator and the image display panel are sequentially disposed on the light path of the first and second illumination beams. The first illumination beam passes through the spatial modulator so that the image display panel displays a first view field image in a first frame period. The second illumination beam passes through the spatial modulator so that the image display panel displays a second view field image in a second frame period.

The present invention further provides a method for reducing stereo-image cross-talk, which includes the following steps. Firstly, in a first scanning block period, a first illumination sub-beam is made to pass through a spatial modulator and be incident onto a sub-picture block of an image display panel, so that the sub-picture block generates a first view field sub-image. Next, the above step is repeated, until all sub-picture blocks of the image display panel sequentially generate a first view field sub-image. Then, in a second scanning block period, a second illumination sub-beam is made to pass through the spatial modulator and be incident onto a sub-picture block of the image display panel, so that the sub-picture block generates a second view field sub-image. Then, the above step is repeated, until all sub-picture blocks of the image display panel sequentially generates a second view field sub-image.

In the present invention, each illumination sub-beam is made to only illuminate a part of the display panel in a certain time period. That is, in a scanning block period, the illumination sub-beam only illuminates a sub-picture block of the image display panel, and meanwhile, the other sub-picture blocks can refresh the frame. In this manner, during the refreshing of the frame, no false view field sub-images are generated on the sub-picture blocks that are not refreshed yet or are being refreshed, such that the ghost image is reduced, and the image quality is improved.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
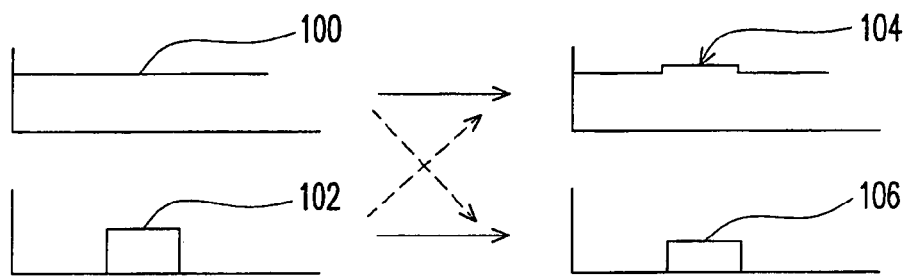
FIG. 1 is a schematic view of a conventional image cross-talk phenomenon.
Figure 2:
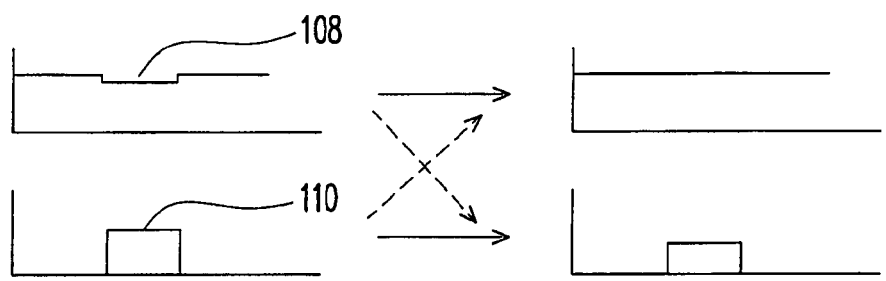
FIG. 2 is a schematic view of a mechanism of improving the cross-talk by using an image-processing manner in the conventional art.

Reference will now be made in detail to the present embodiments of the invention, examples of which are illustrated in the accompanying drawings. Wherever possible, the same reference numbers are used in the drawings and the description to refer to the same or like parts.

Figure 3:
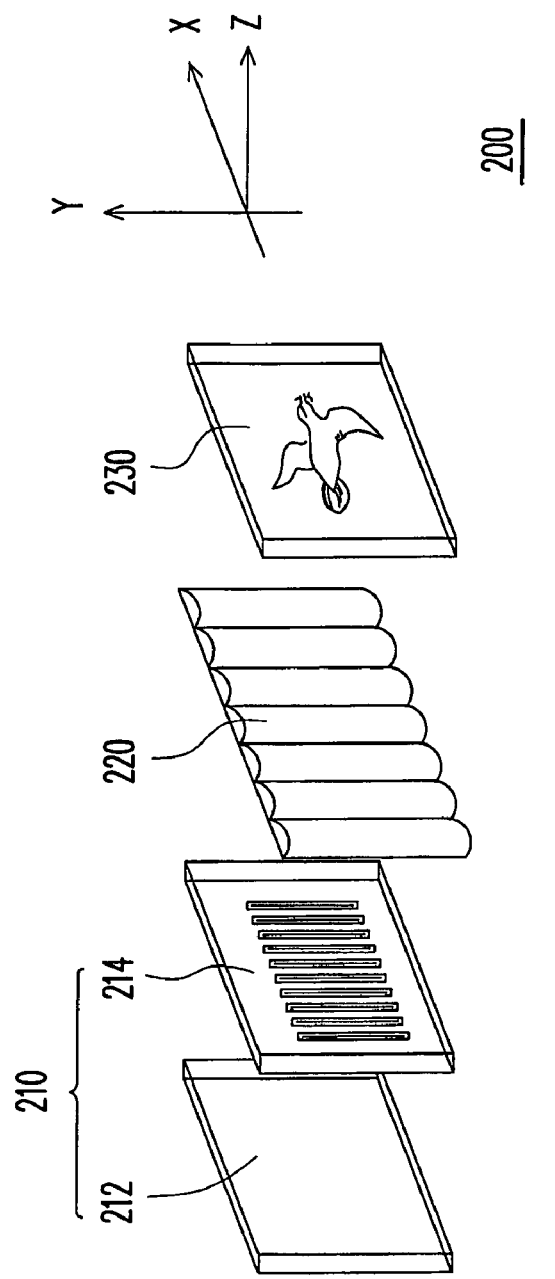
FIG. 3 is a schematic exploded view of a stereo-image displaying apparatus according to an embodiment of the present invention.
Figure 4A:
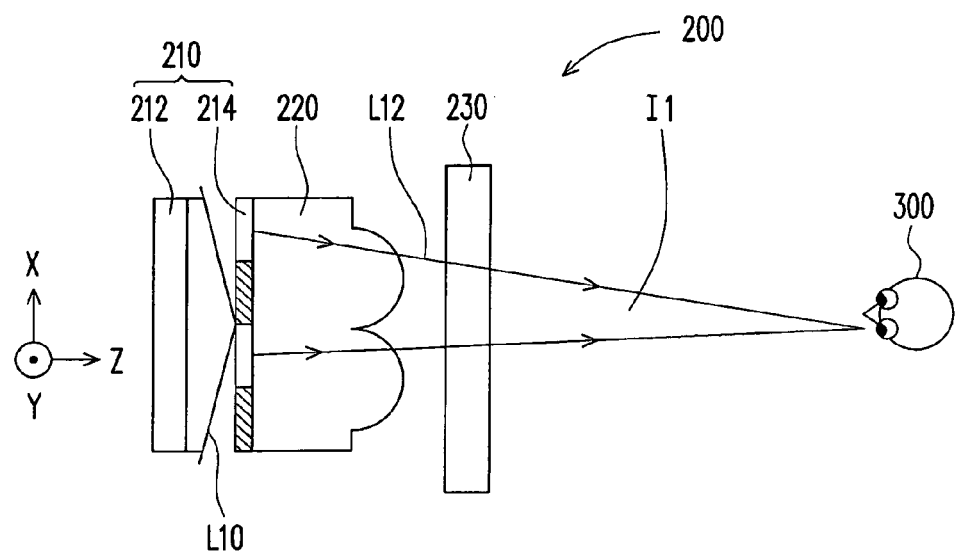
FIGS. 4A and 4B are schematic top views of the stereo-image displaying apparatus in FIG. 3.
Figure 4B:
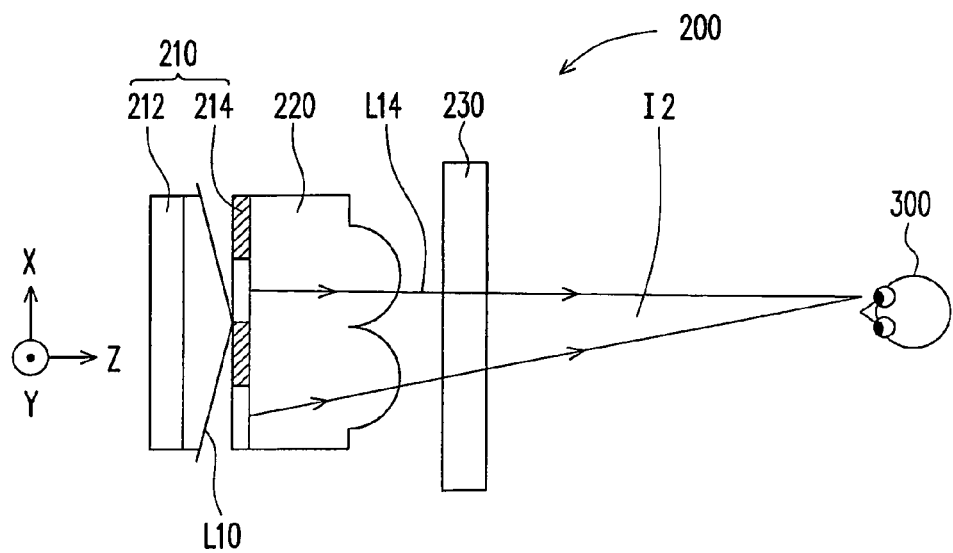

FIG. 3 is a schematic exploded view of a stereo-image displaying apparatus according to an embodiment of the present invention, and FIGS. 4A and 4B are schematic top views of the stereo-image displaying apparatus in FIG. 3. Referring to FIGS. 3, 4A, and 4B, the stereo-image displaying apparatus 200 includes an adjustable light source module 210, a spatial modulator 220, and an image display panel 230. The adjustable light source module 210 may emit a plurality of first illumination beams L12 (merely two illumination beams are shown in the figure) and a plurality of second illumination beams L14 (merely two illumination beams are shown in the figure). The first illumination beams L12 and the second illumination beams L14 are staggered along a first axis X. The spatial modulator 220 and the image display panel 230 are sequentially disposed on the light path of the first illumination beams L12 and the second illumination beams L14. In detail, in this embodiment, the spatial modulator 220 and the image display panel 230 are sequentially disposed on a third axis Z that is substantially vertical to the first axis X.

Figure 5:
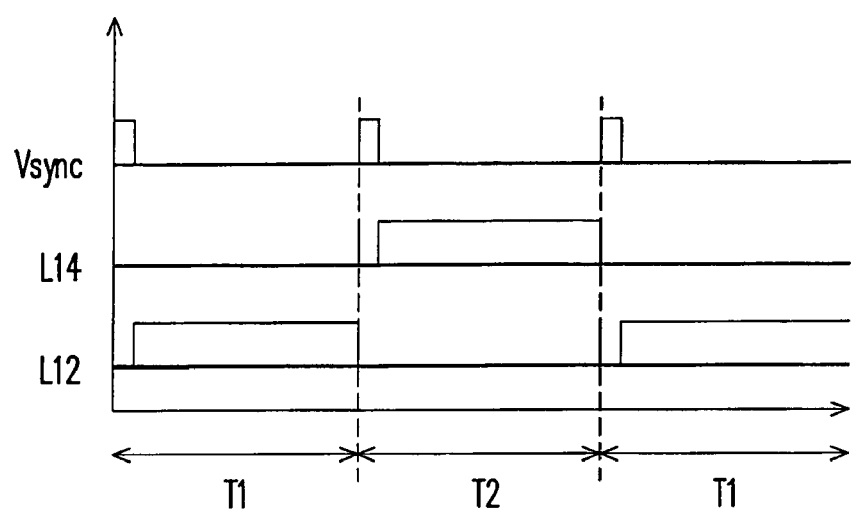
FIG. 5 is a schematic view of a displaying mechanism of the stereo-image displaying apparatus in FIG. 3.

FIG. 5 is a schematic view of a displaying mechanism of the stereo-image displaying apparatus in FIG. 3. Referring to FIGS. 4A, 4B, and 5, the spatial modulator 220 is, for example, micro-lens array, lens array, pinhole array, slit array, filter array, cylindrical lens, or cylindrical lens array, and used for guiding the first illumination beams L12 and the second illumination beams L14 towards different directions. In detail, in a first frame period T1, the first illumination beam L12 passes through the spatial modulator 220, so that the image display panel 230 displays a first view field image I1, as shown in FIG. 4A. In a second frame period T2, the second illumination beam L14 passes through the spatial modulator 220, so that the image display panel 230 displays a second view field image I2, as shown in FIG. 4B. The first frame period T1 and the second frame period T2 are alternatively circulated, and the first view field image I1 and the second view field image I2 are respectively projected to the left and right eyes of a user 300, so as to generate a stereo-image. In addition, before each first frame period T1 and each second frame period T2, a vertical synchronous signal Vsync is provided to ensure that the image display panel 230 can display a complete image.

For example, in this embodiment, the adjustable light source module 210 may include a light source module 212 and a light valve 214. The light source module 212 is, for example, a light emitting diode (LED), cold cathode fluorescent lamp (CCFL), or carbon nanotube field emission light source, which is adapted for emitting an illumination beam L10. The light valve 214 is disposed on the light path of the illumination beam L10, and used to convert the illumination beam L10 into the first illumination beams L12 and the second illumination beams L14. Particularly, the light valve 214 may include a plurality of first light-shielding units 214a and a plurality of second light-shielding units 214b staggered along the first axis X. In the first frame period T1, the first light-shielding units 214a enable the illumination beam L10 to pass through, and the second light-shielding units 214b shield the illumination beam L10, so as to form the first illumination beam L12, and the first illumination beam L12 passes through the spatial modulator 220 to reach the image display panel 230, and thus generating the first view field image I1. In the second frame period T2, the first light-shielding units 214a are made to shield the illumination beam L10, but the illumination beam L10 passes through the second light-shielding units 214b, so as to form the second illumination beam L14. The second illumination beam L14 passes through the spatial modulator 220 to reach the image display panel 230, and thus generating the second view field image I2.

Figure 6A:
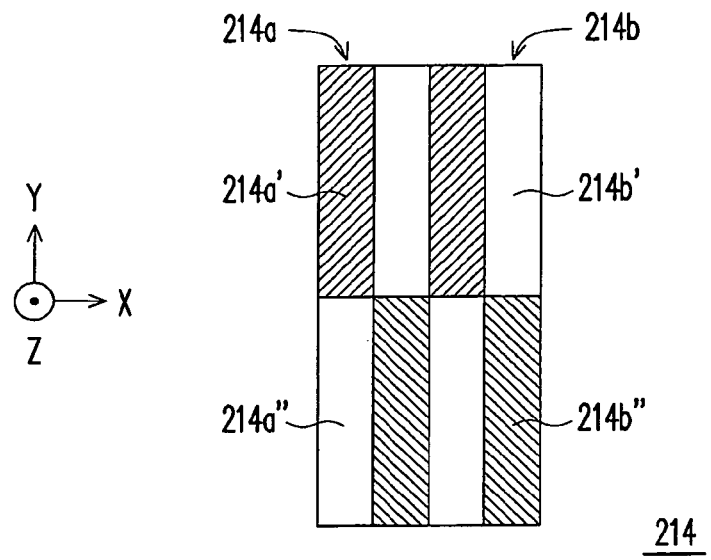
FIGS. 6A and 6B are schematic views of the stereo-image displaying apparatus to generate a first illumination sub-beam according to another embodiment of the present invention.
Figure 6B:
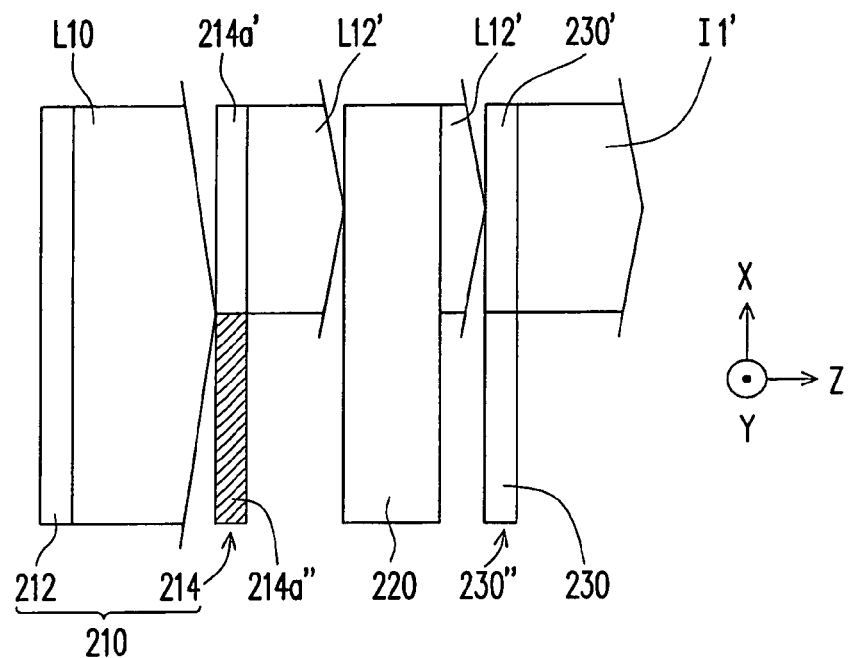
Figure 7A:
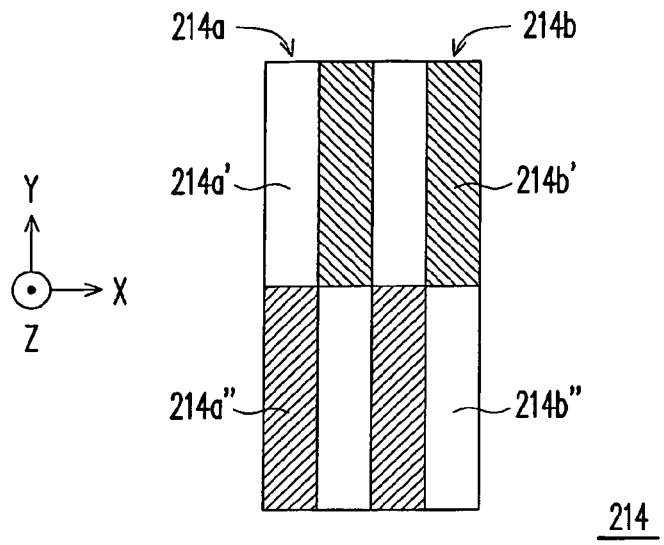
FIGS. 7A and 7B are schematic views of the stereo-image displaying apparatus in FIG. 6A to generate a second illumination sub-beam.
Figure 7B:
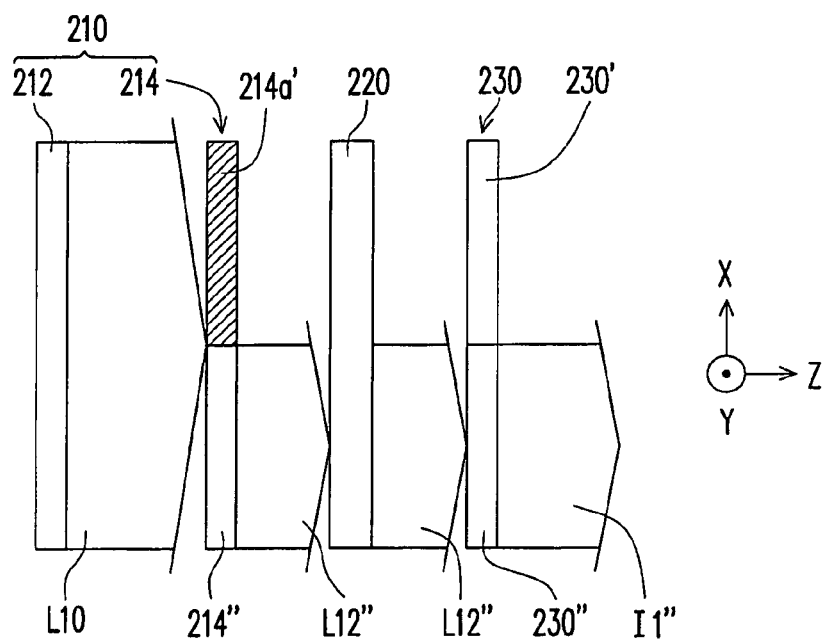
Figure 8:
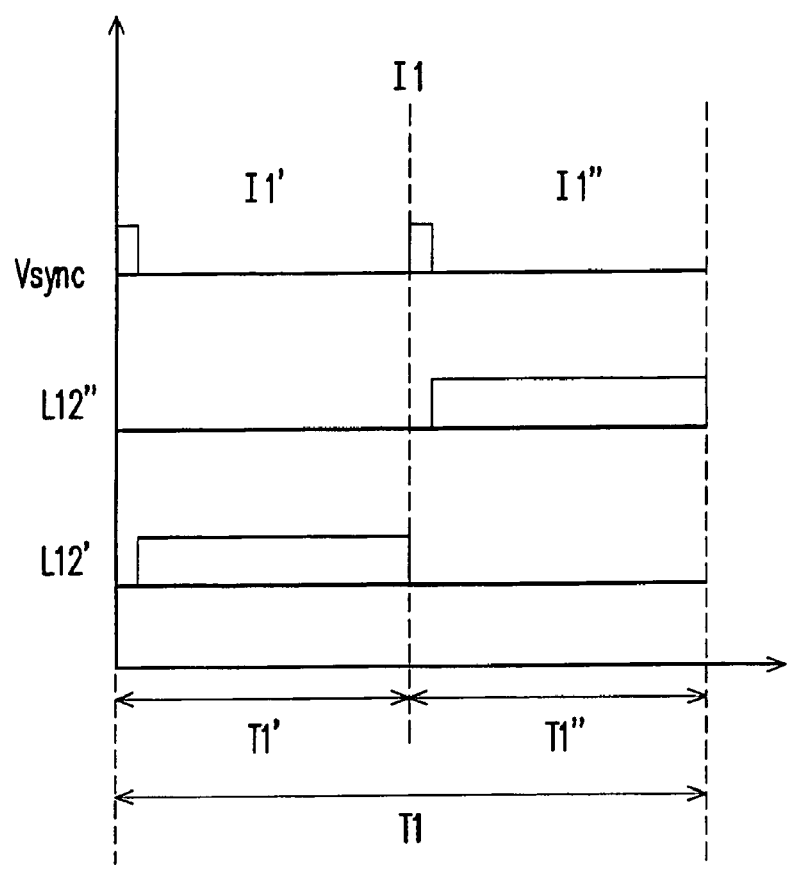
FIG. 8 is a schematic view of a mechanism of improving cross-talk for the stereo-image displaying apparatus in FIG. 6A.

In addition, the first illumination beam L12 may include a plurality of first illumination sub-beams staggered along a second axis Y, and the second illumination beam L14 may include a plurality of second illumination sub-beams staggered along the second axis. FIGS. 6A and 6B are schematic views of the stereo-image displaying apparatus to generate a first illumination sub-beam according to another embodiment of the present invention, FIGS. 7A and 7B are schematic views of the stereo-image displaying apparatus in FIG. 6A to generate a second illumination sub-beam, and FIG. 8 is a schematic view of a mechanism of improving cross-talk for the stereo-image displaying apparatus in FIG. 6A. Referring to FIGS. 6A, 6B, 7A, 7B, and 8, in this embodiment, each first light-shielding unit 214a may include a plurality of first light-shielding elements 214a' and 214a", and each second light-shielding unit 214b may include a plurality of second light-shielding elements 214b' and 214b". The first light-shielding elements 214a' and 214a" and the second light-shielding elements 214b' and 214b" are staggered along the second axis Y. The first light-shielding element 214a' may further divide the first illumination beam L12 into a plurality of first illumination sub-beams L12' and L12" staggered along the second axis Y. The second light-shielding elements 214b' and 214b" may divide the second illumination beam L14 into a plurality of second illumination sub-beams staggered along the second axis (not shown).

Particularly, the image display panel 230 may include a plurality of sub-picture blocks 230' and 230" staggered along the second axis Y, and the first frame period T1 may be divided into a plurality of first scanning block periods T1' and T1". In the first scanning block period T1', a first illumination sub-beam L12' passes through the spatial modulator 220 and is incident onto a sub-picture block 230', so that the sub-picture block 230' generates a first view field sub-image I1'. In the first scanning block period T1", a first illumination sub-beam L12" passes through the spatial modulator 220 and is incident onto a sub-picture block 230", so that the sub-picture block 230" generates a first view field sub-image I1". In the first frame period T1, each first illumination sub-beam L12' and L12" is sequentially incident onto each sub-picture block 230' and 230" at each first scanning block period T1' and T1", so as to generate the first view field sub-images I1' and I1". The first view field sub-images I1' and I1" generated in the first frame period T1 form the first view field image I1. The second illumination sub-beam can also generate the second view field sub-image at each sub-picture block 230' and 230" of the image display panel 230 in each second scanning block period, according to the mode of the first illumination sub-beam, which thus is not repeatedly described here.

In the above embodiment, the image display panel 230 is divided into a plurality of sub-picture blocks 230' and 230" staggered along the second axis Y, and each illumination sub-beam can make the sub-picture blocks 230' and 230" generate the view field sub-images in different time periods. That is, when a view field sub-image is generated in a sub-picture block 230', another sub-picture block 230" does not generate a view field sub-image, and vise versa. Therefore, the image frame can be refreshed, without generating false view field sub-images in the sub-picture blocks 230' and 230" that are not refreshed or are being refreshed. In this manner, even when the displaying apparatus with slower refreshing speed is used as the image display panel 230, the ghost image can be reduced, and the image quality can be improved.

Besides the above implementing manner, the adjustable light source module may be implemented in other modes. For example, in an embodiment (not shown), the adjustable light source module may include a plurality of first light emitting units and a plurality of second light emitting units. The first light emitting units generate the first illumination beams, and the second light emitting units generate the second illumination beams. The first light emitting units and the second light emitting units are, for example, light emitting diode (LED) arrays. In the first frame period, the first light emitting units are turned on, and the second light emitting units are turned off. That is, the first illumination beams are made to pass through the spatial modulator to reach the image display panel, so as to generate the first view field image. In the second frame period, the first light emitting units are turned off, and the second light emitting units are turned on, such that the second illumination beams are made to pass through the spatial modulator to reach the image display panel, so as to generate the second view field image.

In addition, the image display panel is, for example, divided into a plurality of sub-picture blocks along the second axis, but the present invention is not limited thereby. In an embodiment of the present invention (not shown), the image display panel may be divided into a plurality of sub-picture blocks along the first axis, or it may be divided into a plurality of sub-picture blocks along the first axis and the second axis. Upon understanding the above descriptions, those skilled in the art can make the configuration according to the actual requirements.

It should be noted that, two view field images are taken as an example for demonstration in the above embodiments, but the present invention is not limited here. For example, in an embodiment of the present invention (not shown), the adjustable light source module may further emit a third illumination beam, and the third illumination beam passes through the spatial modulator and is incident onto the image display panel, such that the image display panel generates a third view field image in a third frame period. The method for reducing stereo-image cross-talk further includes the following steps. Firstly, in a third scanning block period, a third illumination sub-beam is made to pass through the spatial modulator and be incident onto a sub-picture block of the image display panel, such that the sub-picture block generates a third view field sub-image. Then, the above step is repeated, until all the sub-picture blocks of the image display panel sequentially generate a third view field sub-image, so as to form a third view field image. In addition, those skilled in the art can further make design to generate more view field images based upon the above descriptions, for example, to generate a fourth and a fifth view field image, but the present invention is not limited here.

To sum up, in the above embodiments, the image display panel can be divided into a plurality of sub-picture blocks staggered along the second axis, and each illumination sub-beam can make the sub-picture blocks generate view field sub-images in different time periods. That is, when a view field sub-image is generated in a sub-picture block, the other sub-picture blocks do not generate view field sub-images, and vise versa. Therefore, the image frame may be refreshed, without generating false view field sub-images at the sub-picture blocks that are not refreshed or are being refreshed. In this manner, even when the displaying apparatus with slower refreshing speed is used as the image display panel, the ghost image can be reduced, and the image quality can be improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:
1. A stereo-image displaying apparatus, comprising:
an adjustable light source module, adapted for emitting a plurality of first illumination beams and a plurality of second illumination beams that are staggered along a first axis, wherein each of the first illumination beams comprises a plurality of first illumination sub-beams staggered along a second axis, each of the second illumination beams comprises a plurality of second illumination sub-beams staggered along the second axis, and the second axis is substantially vertical to the first axis;

a spatial modulator, disposed on a light path of the first illumination beam and the second illumination beam emitted from the light source module; and an image display panel, disposed on the light path of the first illumination beam and the second illumination beam from the spatial modulator, wherein in a first frame period, the first illumination beams pass through the spatial modulator and are incident onto the image display panel, such that the image display panel displays a first view field image, and in a second frame period, the second illumination beams pass through the spatial modulator and are incident onto the image display panel, such that the image display panel displays a second view field image, wherein the first view field image and the second view field image are respectively projected to left and right eyes of a user, so as to generate a single stereo-image, wherein each of the first illumination sub-beams are sequentially emitted in the first frame period with respect to each other when the first illumination beams pass through the spatial modulator and are incident onto the image display panel, and each of the second illumination sub-beams are sequentially emitted in the second frame period with respect to each other when the second illumination beams pass through the spatial modulator and are incident onto the image display panel.

2. The stereo-image displaying apparatus according to claim 1, wherein the adjustable light source module comprises:
a light source module, adapted for emitting an illumination beam; and
a light valve, disposed on a light path of the illumination beam, and used for converting the illumination beam to the first illumination beams and the second illumination beams.

3. The stereo-image displaying apparatus according to claim 2, wherein the light valve comprises a plurality of first light-shielding units and a plurality of second light-shielding units alternatively staggered along the first axis, wherein when the first light-shielding units are turned on, and the second light-shielding units are turned off, the adjustable light source module generates the first illumination beam, and when the second light-shielding units are turned on, and the first light-shielding units are turned off, the adjustable light source module generates the second illumination beam.

4. The stereo-image displaying apparatus according to claim 3, wherein each of the first light-shielding units comprises a plurality of first light-shielding elements staggered along a second axis, and each of the second light-shielding units comprises a plurality of second light-shielding elements staggered along the second axis, wherein the first axis is substantially vertical to the second axis.

5. The stereo-image displaying apparatus according to claim 1, wherein the spatial modulator comprises micro-lens array, lens array, pinhole array, slit array, filter array, cylindrical lens, or cylindrical lens array.

6. The stereo-image displaying apparatus according to claim 2, wherein the light source module comprises a light emitting diode (LED), a cold cathode fluorescent lamp (CCFL), or a carbon nanotube field emission light source.

7. The stereo-image displaying apparatus according to claim 1, wherein the adjustable light source module further emits a third illumination beam, wherein the third illumination beam passes through the spatial modulator and is incident onto the image display panel, such that the image display panel generates a third view field image in a third frame period.

8. A method for reducing stereo-image cross-talk, comprising:
making a first illumination sub-beam pass through a spatial modulator and be incident onto a sub-picture block of an image display panel, so that the sub-picture block generates a first view field sub-image in a first scanning block period;
repeating the above step, until all sub-picture blocks of the image display panel sequentially generate a first view field sub-image;
making a second illumination sub-beam pass through the spatial modulator and be incident onto a sub-picture block of the image display panel, so that the sub-picture block generates a second view field sub-image in a second scanning block period; and
repeating the above step, until all sub-picture blocks of the image display panel sequentially generate a second view field sub-image, wherein a first view field image is composed of the first view sub-field images, a second view field image is composed of the second view sub-field images, and the first view field image and the second view field image are respectively projected to left and right eyes of a user, so as to generate a single stereo-image, wherein each of the first illumination sub-beams are sequentially emitted in a first frame period with respect to each other when the first view field image is displayed, and each of the second illumination sub-beams are sequentially emitted in a second frame period with respect to each other when the second view field image is displayed.

9. The method for reducing stereo-image cross-talk according to claim 8, further comprising making an illumination beam pass through a light valve to form the first illumination sub-beam and the second illumination sub-beam.

10. The method for reducing stereo-image cross-talk according to claim 8, further comprising:
making a third illumination sub-beam pass through the spatial modulator and be incident onto a sub-picture block of the image display panel, so that the sub-picture block generates a third view field sub-image in a third scanning block period; and
repeating the above step, until all sub-picture blocks of the image display panel sequentially generate a third view field sub-image.

* * * * *